United States Patent
Betz (10) Patent No.: US 12,134,895 B2
(45) Date of Patent: Nov. 5, 2024

(54) STRUCTURE PRETENSIONED BY AT LEAST ONE TENSIONING ELEMENT, AND METHOD FOR PRODUCING A STRUCTURE PRETENSIONED BY AT LEAST ONE TENSIONING ELEMENT

(71) Applicant: MAX BOEGL WIND AG, Sengenthal (DE)

(72) Inventor: Thorsten Betz, Oberpfalz (DE)

(73) Assignee: MAX BOEGL WIND AG, Sengenthal (DE)

( * ) Notice: Subject to any disclaimer, the term of this patent is extended or adjusted under 35 U.S.C. 154(b) by 170 days.

(21) Appl. No.: 17/772,627

(22) PCT Filed: Oct. 1, 2020

(86) PCT No.: PCT/EP2020/077555
§ 371 (c)(1),
(2) Date: Apr. 28, 2022

(87) PCT Pub. No.: WO2021/083604
PCT Pub. Date: May 6, 2021

(65) Prior Publication Data
US 2022/0403655 A1 Dec. 22, 2022

(30) Foreign Application Priority Data
Oct. 30, 2019 (DE) .......................... 102019129354.5

(51) Int. Cl.
*E04C 5/12* (2006.01)
*E04H 12/12* (2006.01)
(Continued)

(52) U.S. Cl.
CPC .............. *E04C 5/12* (2013.01); *E04H 12/12* (2013.01); *E04H 12/16* (2013.01); *F03D 13/20* (2016.05);
(Continued)

(58) Field of Classification Search
CPC . E04H 12/16; E04H 12/12; E04C 5/12; F05B 2240/912; E04G 21/12
See application file for complete search history.

(56) References Cited

U.S. PATENT DOCUMENTS 6,161,350 A * 12/2000 Espinosa ................. F16B 21/16
411/536
9,062,662 B1 * 6/2015 Johnson ................. F03D 13/10
(Continued)

FOREIGN PATENT DOCUMENTS

AU  2018310683 A1 * 3/2020 ............. E02D 27/08
DE  10 2010 010 347 A1  9/2011
(Continued)

OTHER PUBLICATIONS

International Preliminary Report on Patentability in PCT/EP2020/077555, dated Jan. 29, 2021.

*Primary Examiner* — Andrew J Triggs
(74) *Attorney, Agent, or Firm* — Foley & Lardner LLP (57) ABSTRACT

A structure, in particular, a wind turbine tower (1), which is pre-tensioned with at least one tensioning element (3), has a foundation (2), a concrete tower section (4), in particular, consisting of a plurality of precast concrete elements (5), as well as a head piece (6), wherein the tensioning element (3) at least at one of its ends has a tendon anchor (7, 7a, 7b). The tendon anchor (7, 7a, 7b) has an accommodation (8) in which a first end (10a) of an anchor rod (9) is fastened, in particular screwed in. A second end (10b) of the anchor rod (9) is anchored to the foundation (2) or to the head piece (6). In a corresponding method for manufacturing a structure, a first end (10a) of an anchor rod (9) is fastened, in particular screwed in an accommodation (8) of a tendon anchor (7, 7a, 7b), and a second end (10b) of the anchor rod (9) is anchored to the foundation (2) or to the head piece (6).

18 Claims, 5 Drawing Sheets

(51) Int. Cl.
  *E04H 12/16* (2006.01)
  *E04H 12/34* (2006.01)
  *F03D 13/20* (2016.01)

(52) U.S. Cl.
  CPC ...... *E04H 12/342* (2013.01); *F05B 2240/912* (2013.01)

(56) References Cited

U.S. PATENT DOCUMENTS

| | | |
|---|---|---|
| 10,954,686 B2 | 3/2021 | Chase et al. |
| 11,168,457 B2 * | 11/2021 | Betz .................. E02D 27/425 |
| 11,773,650 B2 * | 10/2023 | Betz .................. E06C 9/12 |
| | | 52/79.4 |
| 2013/0212963 A1 | 8/2013 | Miks et al. |
| 2018/0238071 A1 * | 8/2018 | Chase .................. F03D 13/10 |
| 2022/0403655 A1 * | 12/2022 | Betz .................. F03D 13/20 |

FOREIGN PATENT DOCUMENTS

| | | | |
|---|---|---|---|
| DE | 10 2013 108 692 A1 | 2/2015 | |
| DK | 2738322 T3 * | 4/2016 | ............ E02D 27/42 |
| EP | 1 262 614 B1 | 12/2002 | |
| EP | 2 738 322 B1 | 6/2014 | |
| EP | 2738322 A1 * | 6/2014 | ........... E02D 27/425 |
| WO | WO-2017/039975 A1 | 3/2017 | |
| WO | WO-2019/025505 A1 | 2/2019 | |

\* cited by examiner

STRUCTURE PRETENSIONED BY AT LEAST ONE TENSIONING ELEMENT, AND METHOD FOR PRODUCING A STRUCTURE PRETENSIONED BY AT LEAST ONE TENSIONING ELEMENT

CROSS-REFERENCE TO RELATED PATENT APPLICATIONS

This application is a U.S. national phase application under 35 U.S.C. § 371 of International Application No. PCT/EP2020/077555, filed on Oct. 1, 2020, which claims priority to Germany Priority Application 102019129354.5, filed Oct. 30, 2019 including the specification, drawings, claims and abstract, all of which are incorporated herein by reference in their entireties.

BACKGROUND

The present invention relates to a structure, in particular to a wind turbine tower, which is pre-tensioned with at least one tensioning element. The structure furthermore comprises a foundation, a concrete tower section, in particular made up of a plurality of precast concrete elements arranged one above the other, as well as one head piece. The tensioning element is provided with a tendon anchor at least at one of its ends.

Pre-tensioned structures have become known in the prior art in various embodiments and are also, for example, used in wind turbine towers. According to one embodiment, the tensioning elements are guided in tensioning channels which are provided within the concrete cross section. EP 2 738 322 B1, for example, shows a wind turbine tower, in which the tensioning elements are guided through tensioning channels within the walls of the concrete towers.

A wind turbine tower is known from EP 1 262 614 B1, in which tower the tensioning elements are guided outside the tower wall through the interior of the tower structure. The tensioning elements are, thereby, fixed on the one side in a head bearing element and on the other side to a base bearing element in the foundation. A so-called tensioning basement is provided to accommodate the tension anchors of the tensioning elements and to apply the jacks for pre-tensioning. In this way, the foundation contains a type of ring-shaped bracket through which the tensioning elements are passed through and below which the tensioning elements are anchored in the tension basement. Because of the tension basement and the bracket, the foundation must be comparatively large and be provided with strong reinforcement.

In order to avoid the use of a tension basement, construction with rear suspension devices have also been suggested. EP 2 738 322 B1 mentioned hereabove shows such an embodiment. In such an embodiment, the rear suspension device comprises an anchor plate as well as anchor rods connected to the anchor plate, which are poured into the foundation. The anchor rods protrude from the top side of the foundation. The lowest tower section is provided with recesses in which the projecting part of the anchor rod as well as a connecting element for connection with the tensioning element passing through the tower wall can be accommodated.

WO 2017/039975 A1 also shows a similar design of rear suspension construction. For assembly, the tensioning element must initially be threaded through an opening of the connecting element. Thereinafter, a tensioning jack is applied, the tensioning element is pre-tensioned and finally anchored to the connecting element. The threading of the tensioning elements into the connecting element is time-consuming. In addition, this embodiment also requires that a comparatively large amount of space be provided for the positioning of the tensioning jacks.

The task of the present invention is therefore to propose a pre-tensioned structure, in which the assembly and pre-tensioning of the tensioning elements is facilitated. Furthermore, a corresponding method is to be proposed.

The task is solved by a structure and a method having the features of the independent claims.

SUMMARY OF THE INVENTION

A structure, in particular, a wind turbine tower, which is pre-tensioned with at least one tensioning element, has a foundation, a concrete tower section, in particular, consisting of a plurality of precast concrete elements arranged one above the other, as well as a head piece. The tensioning element is provided with one tendon anchor at least at one of its ends. It is provided that the tendon anchor has at least one accommodation, in which a first end of an anchor rod is fixed, and that a second end of the anchor rod is anchored to the foundation or to the head piece.

In the corresponding method for manufacturing a structure pre-tensioned with at least one tensioning element and comprising a foundation, a concrete tower section as well as a head piece, the tensioning element is provided with a tendon anchor at least at one of its two ends. It is provided that a first end of an anchor rod is fixed in an accommodation of the tendon anchor and that a second end of the anchor rod is anchored to the foundation or to the head piece.

The tensioning element is therefore no longer anchored directly to the foundation or to the head piece, but rather indirectly by means of an additional anchor rod, which rod is arranged in extension of the tensioning element.

This provides numerous advantages. In this manner, the very long and heavy tensioning elements no longer need to be passed through the bracket of the foundation or the head piece, or in the case of a rear suspension construction, through the opening in an anchor plate. Instead, it is sufficient to anchor the very short anchor rod to the foundation, head piece or rear suspension construction. The tensioning element and the anchor rod can then be connected in a simple manner by means of the accommodation at an easily accessible point. Assembly is hereby also more flexible and the tensioning element can, depending on the execution of the anchoring and of the tensioning device, be connected with the anchor rod either before, or after, or alternatively even first during the pre-tensioning. The replacement as well as the application of alternative tensioning elements without modifications of the anchoring interfaces is also facilitated. The tensioning jacks can also be better positioned due to the better accessibility of the tendon anchor and smaller tensioning jacks can also be used if necessary.

Advantageously, the first end of the anchor rod is screwed into the accommodation of the tendon anchor. The accommodation is therefore preferably implemented as a thread, in particular as an internal thread. In this manner, the anchor rod can easily be screwed into the accommodation of the tendon anchor.

It is moreover advantageous if the tendon anchor is designed as a fixed anchor. Due to the better accessibility of the connection point between the tensioning element and the anchor rod, tensioning jacks can easily be positioned and be connected with the tendon anchor. This eliminates the need for tension anchors, which are significantly more complex and require more space.

It is also advantageous if the anchor rod is or alternatively will be fastened in the axial extension of the tensioning element in the tendon anchor. In so doing, the anchor rod shows no lateral offset (transverse to the longitudinal axis of the tensioning element or tendon anchor) with respect to the tensioning element. The flow of forces is not disturbed due to the direct axial load transmission. In addition, the tendon anchor can be designed in a compact manner. If the accommodation is implemented as a thread, this assures that there is particularly good centering of the of the anchor rod with reference to the tensioning element.

It is likewise advantageous, if the first end of the anchor rod is fastened in the tendon anchor by means of an adaptor piece such as, for example, a reducing nut or a reducing sleeve. This allows anchor rods of different diameters, as well as different tensioning elements, to be combined together by using different reducing nuts or reducing sleeves. The anchor rods can also be provided with a standardized connection at their first end and nevertheless be combined with different tensioning elements or tensioning systems by means of the adaptor piece. The replacement of tensioning elements is also facilitated.

The use of a sleeve, in particular, a reducing sleeve, is advantageous in that the sleeve can be used for taking in excess lengths of tensioning elements resulting from pre-tensioning.

The advantages of the invention come to bear, in particular, in combination with a rear suspension construction. Correspondingly, it is advantageous if the second end of the anchor rod is anchored to a rear suspension device that is or will be embedded in the foundation. This facilitates the installation of the tensioning elements as well as the anchor rods, since there is no need to thread the anchor rods through the bracket of the foundation. The anchor rod must, for example, only be connected to the rear suspension device protruding from the top side of the foundation. If the anchor rod is itself a part of an embedded rear suspension device, the same anchor rod can also be inserted during pouring of the foundation and only needs to be connected to the tendon anchor subsequently.

The rear suspension device preferably comprises at least one lower anchor plate that is embedded in the foundation. The anchor rod can be attached directly to this anchor plate or by means of further components.

It is advantageous if the second end of the anchor rod is connected to the rear suspension device by means of at least one upper anchor plate. The upper anchor plate is preferably initially loose, which is to say, not connected to the embedded rear suspension device, which thereby facilitates the connection of the lower end of the anchor rod. In the further process, it is advisable to pre-tension the upper anchor plate so that it remains permanently connected to the foundation or remains in contact with it.

Likewise, it is advantageous if the second end of the anchor rod is anchored to the head piece or to the foundation in an articulated manner. In so doing, tolerances can easily be accommodated without it coming to angular deviations of the tensioning elements that are not permissible or to kinking of the tensioning elements. The positional accuracy requirements of the rear suspension devices can hereby be reduced. The articulated anchoring can, for example, be achieved by means of a spherical collar nut and/or a spherical cap. Alternatively or additionally, it is however also possible to surround an anchor rod embedded in the concrete with a soft layer or a soft sleeve, which then absorbs the eventual angular deviations between the tensioning element and the rear suspension device.

Furthermore, it is advantageous if the foundation has a cavity for taking in a lower anchoring of the second end of the anchor rod, wherein the cavity is preferably provided in a top side of the foundation. For example, an articulated anchoring with a spherical collar nut can be well accommodated in the cavity. Furthermore, the cavity can provide access to an anchoring located below the top of the foundation.

In the method, it is also advantageous if the tensioning element is pre-tensioned by means of at least one tensioning jack. In this way, it is also possible to realize large tensioning strokes while at the same time, in contrast to pre-tensioning through the use of nuts, avoiding the introduction of torsion into the tensioning element.

When tensioning the tensioning elements, it is advantageous if the first end of the anchor rod is initially connected to the tendon anchor, then the tensioning element is subsequently pre-tensioned by means of the at least one tensioning jack and only following pre-tensioning is the second end of the anchor rod anchored to the foundation or to the head piece. The tensioning element can hereby be pre-tensioned in a downward direction together with the anchor rod, which facilitates the positioning of tensioning jacks.

It is likewise advantageous if the tensioning element connected to the anchor rod is tensioned against the foundation, in particular, the rear suspension device of the foundation, or against the head piece.

According to another embodiment, it is advantageous if the second end of the anchor rod is initially anchored to the foundation, the tensioning element is subsequently pre-tensioned by means of the at least one tensioning jack and it is then only following the pre-tensioning of the first end of the anchor rod that it is connected with the tendon anchor. In so doing, the anchor rod can be anchored to the foundation both before, as well as also after, the pouring of the foundation. A very good centering can be achieved by means of the threads onto which the tensioning device engages, which accuracy is required both for the advantageous flow of forces as well as also for the required assembly accuracy during pre-tensioning.

It is thereby advantageous, if the tensioning element is pre-tensioned against the anchor rod anchored at its second end to the foundation. In this embodiment, too, the tendon anchor is easily accessible and the positioning of the tensioning jacks is facilitated.

It is particularly advantageous, if a required length of the tensioning element is determined taking into account the length of the anchor rod(s), the required length is shortened by one tensioning stroke and the tensioning element is pre-fabricated with the shortened length. Accordingly, even in the case of long tensioning strokes, no or only minimal space must be provided to take on the excess lengths of the tensioning elements.

Further advantages of the invention are described in the following embodiments. Wherein:

BRIEF DESCRIPTION OF THE DRAWINGS

FIG. 5b shows the anchoring of an anchor rod following the tensioning of the tensioning element of FIG. 5a.

DETAILED DESCRIPTION

In the following description of the embodiment examples, identical features, or features that are at least comparable in their design and/or mode of operation are provided with the same reference sign. Moreover, they are only explained in detail when they are mentioned for the first time, whereas, in the following embodiment examples, only the differences to the already previously described embodiment examples will be dealt with. Furthermore, for reasons of clarity, often only one or only a few of several identical components or features are labeled.

Figure 1:
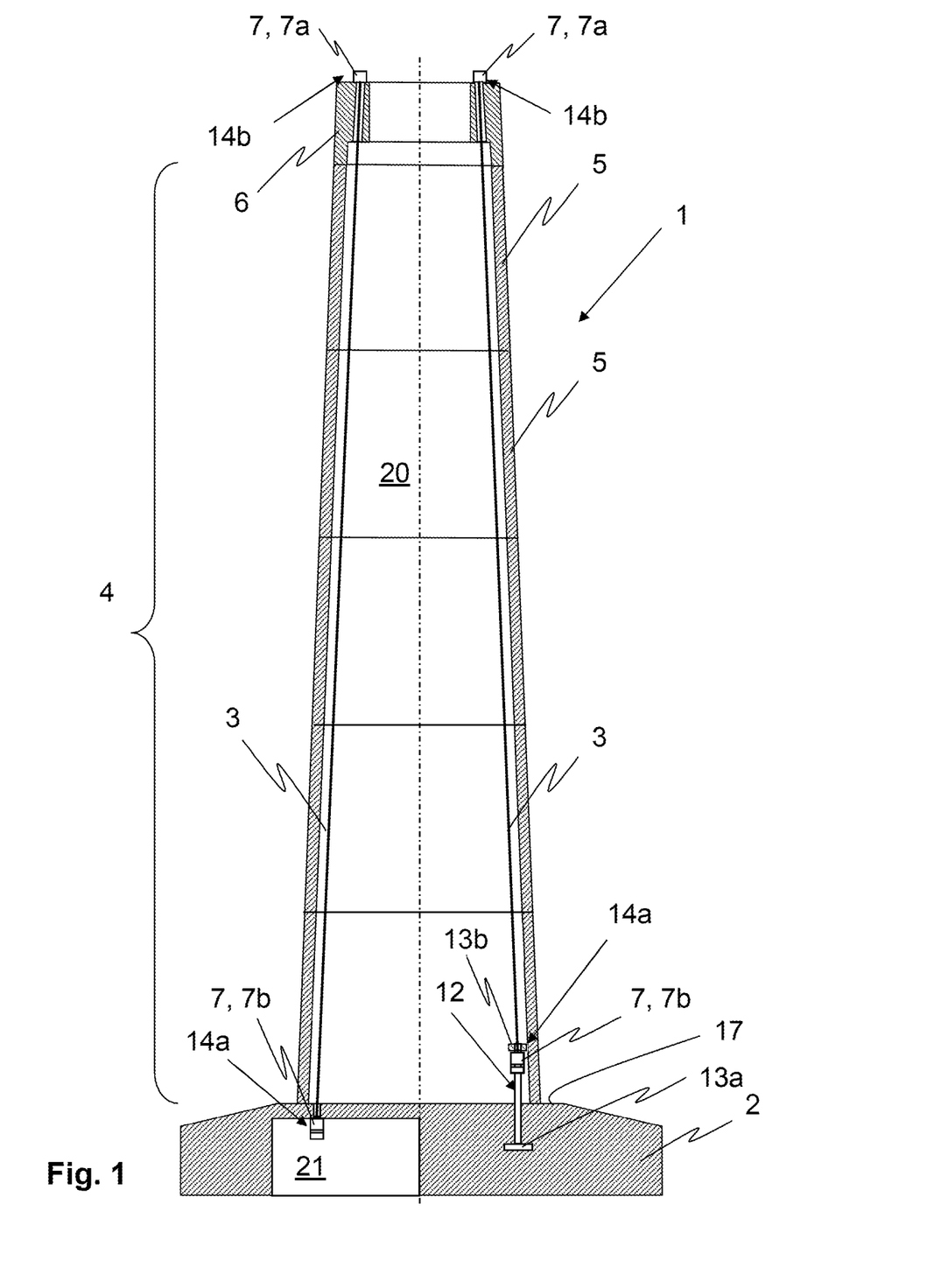
FIG. 1 shows a schematic, cross-sectional view of a pre-tensioned structure in an overview representation.

FIG. 1 shows a schematic, cross-sectional overview representation of a structure pre-tensioned by means of at least one tensioning element 3. The structure is implemented as a wind turbine tower 1 and has a foundation 2, a tower section 4 made out of concrete as well as a head piece 6. The tower section 4 made out of concrete consists of a plurality of ring-shaped or ring-segment-shaped precast concrete elements 5 arranged one above the other. Alternatively, it would, however, also be conceivable that the tower section 4 is made of other-shaped precast concrete elements or cast-in-place concrete. Furthermore, two tensioning elements 3 are visible. In reality, a plurality of tensioning elements 3 is usually distributed around the perimeter of the structure or alternatively of the wind turbine tower 1. The tensioning elements 3 extend between a lower anchoring 14a, which is located in the foundation 2, and an upper anchoring 14b, which is located in the head piece 6. The tensioning elements 3 are respectively anchored to the upper and the lower anchorings 14a, 14b by means of a tendon anchor 7.

The tensioning elements 3 are anchored to the upper anchoring 14b by means of a fixed anchor 7a, whereas a tension anchor 7b is provided at the foundation. In principle, it is, however, likewise possible to provide a fixed anchor 7a at the lower anchoring 14a and a tension anchor 7b at the upper anchoring. It is likewise also possible to provide fixed anchors 7a at both ends. In the present case, the tensioning elements 3 run as external tensioning elements 3 outside of the concrete cross section in an interior 20 of the structure. The tensioning elements 3 can, however, also be guided at least partially in tensioning channels inside the walls of the structure.

FIG. 1 shows an anchoring of the tensioning elements 3 according to the state of the art. The tensioning elements 3 for the upper anchoring 14b are directly anchored to the foundation 2 or the head piece 6 by means of the tendon anchor 7. The tensioning elements 3 are threaded through a corresponding opening in the head piece 6 and then anchored to the head piece 6 above it. Two different prior art embodiments are shown for the lower anchoring 14a in FIG. 1. To the left of the centerline, an embodiment of the lower anchoring 14a in a tension basement 21 is shown. The tensioning element 3 is passed through an opening in the foundation 2 for this anchoring 14a and anchored below the bracket-like projection above the tension basement 21 by means of a tendon anchor 7. By contrast, to the right of the centerline, a lower anchoring 14a of the tensioning element 3 is shown on a rear suspension device 12, which rear suspension device is embedded in the foundation 2. The rear suspension device 12 comprises a lower anchor plate 13a poured into the concrete of the foundation 2 as well as one or a plurality of anchor rods (not labeled) that are connected thereto, which are also poured in. The rear suspension device 12 projects beyond the upper surface 17 of the foundation 2, so that it can easily be connected there to the tensioning element 3. The upper side 17 of the foundation 2 designates the side facing away from the ground on which the concrete tower section 4 is placed upon. The connection of the rear suspension device 12 with the tensioning element 3 here occurs by means of an upper anchor plate 13b, which is connected on the one side with the rear suspension device 12 and on the other side the tensioning element 3 is anchored by means of a tendon anchor 7. For this purpose, the tensioning element 3 must be threaded through an opening in the anchor plate 13b.

The present invention now proposes an improved embodiment of a lower and/or upper anchoring 14a, 14b of a tensioning element 3. The tensioning element 3 here is not directly anchored in the foundation 2 or in the rear suspension device 12 or in the head piece 6, but rather only indirectly by means of an additional anchor rod 9. For this purpose, the anchor rod 9 is accommodated with its first end 10a in an accommodation 8 of the tendon anchor 7 of the tensioning element 3. The anchor rod 9, in comparison to the tensioning element 3, is very short and can therefore be handled very easily.

Figure 2:
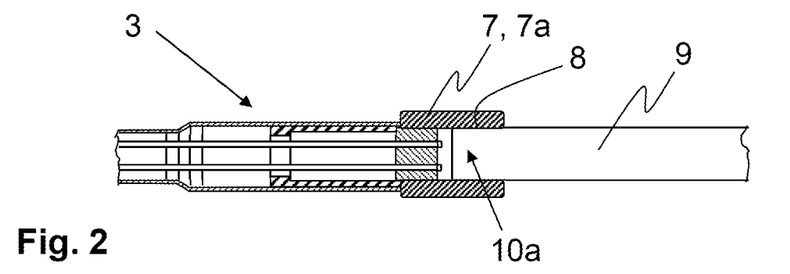
FIG. 2 shows an interrupted cross-sectional view of a tensioning element with an anchor rod received in an accommodation

FIG. 2 shows a tensioning element 3 in an interrupted representation with a tendon anchor 7, in which an anchor rod 9 is accommodated with its first end 10a. The accommodation 8 is formed by an internal thread, which internal thread is directly inserted into the tendon anchor 7. The anchor rod 9 is likewise provided with a thread on its first end 10a and can thereby be screwed into the accommodation 8 in a simple manner. Since the tensioning element 3 is not directly anchored in the foundation 2 or in the head piece 6, but rather by means of the anchor rod 9, the tendon anchor 7 can also be designed as a simple fixed anchor 7a, as will be explained in more detail on the basis of the following figures.

Figure 3:
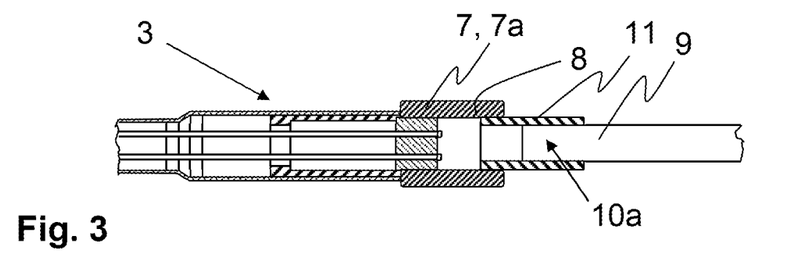
FIG. 3 shows an interrupted cross-sectional view of a tensioning element with an anchor rod received in an accommodation according to a second embodiment.

In contrast, FIG. 3 shows a tensioning element 3 with a tendon anchor 7, in which the first end 10a of the anchor rod 9 is accommodated by means of an adaptor piece 11. The adaptor piece 11 is here designed as a reducing sleeve, but could also be provided as a reducing nut. In so doing, different anchor rods 9 can be fastened in the tendon anchor 7 by means of different adaptor pieces 11, or, conversely, different tensioning elements with different tendon anchors can be attached to a standardized anchor rod 9. This provides for great flexibility in the assembly of structures, and tensioning elements 3 from different manufacturers can be used and can also be interchanged. Another particular advantage of such an adaptor piece 11 is that it can be used to connect the tensioning element 3 and the anchor rod 9 without torsional forces.

Figure 4:
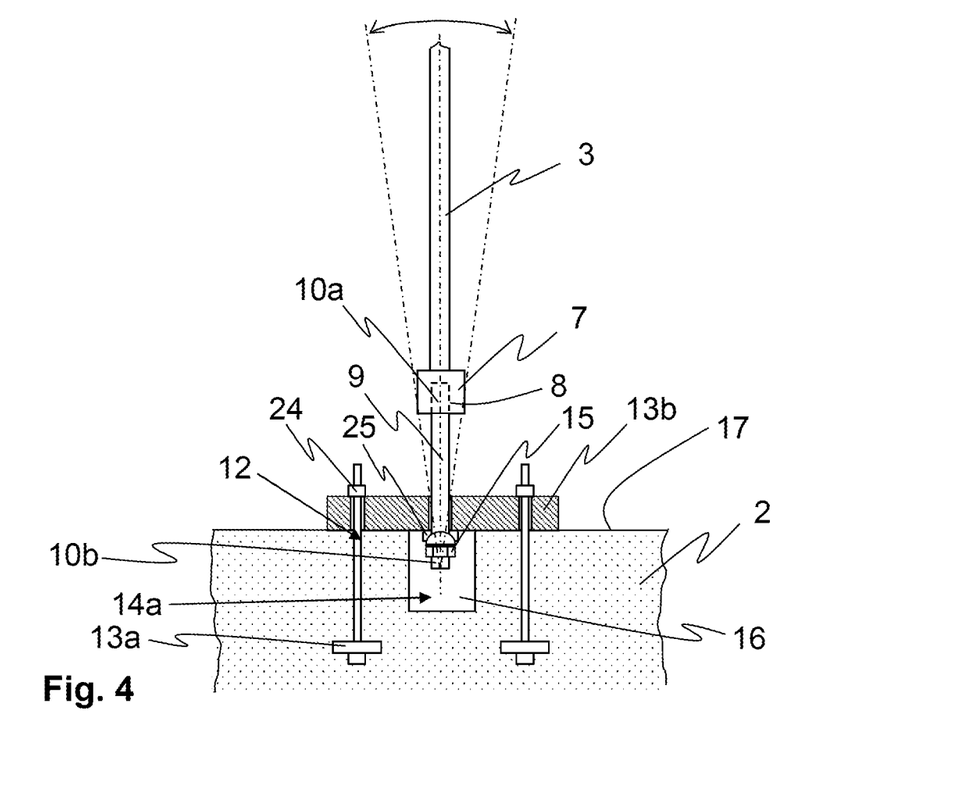
FIG. 4 shows a cross-sectional detailed view of a lower anchoring in a foundation according to a first embodiment.

FIG. 4 now shows an improved lower anchoring 14a of a tensioning element 3 to a foundation 2 by means of the anchor rod 9. The anchor rod 9 is accommodated with its first end, which, following assembly, is the upper end 10a, in the tendon anchor 7 of the tensioning element 3. The connection of the anchor rod 9 with the foundation 2 or here with the rear suspension device 12 is significantly easier than the direct anchoring of the tensioning element 3, since the short anchor rod 9 can more easily be handled. The tensioning element 3 no longer needs to be threaded through an opening in the concrete or through an anchor plate 13. In addition, the anchoring of the anchor rod 9 to the lower anchoring 14a can also occur independently of the connecting of the anchor rod 9 with the tensioning element 3 as well as independently of the pre-tensioning of the tensioning element 3, as will be explained in more detail on the basis of FIG. 5a and FIG. 5b.

According to the present example, the second end 10b of the anchor rod 9 is anchored in an articulated manner to the lower anchoring 14a. This makes it easy to compensate for tolerances, since the tensioning element 3 together with the anchor rod 9 can, within limits, align itself, as symbolized by the two dashed lines as well as the indicated angle. A spherical collar nut 15 as well as curved plate 25 are provided for an articulated anchoring.

The rear suspension device 12 consists of two lower anchor plates 13a poured into the foundation 2 as well as anchor rods connected thereto (not labeled), which anchor rods project beyond the upper side 17 of the foundation 2. The second, in this case, lower end 10b of the anchor rod 9 is anchored by means of the spherical collar nut 15 to an upper, initially still loose, anchor plate 13b, which in turn is connected to the rear suspension device 12 by means of lock nuts 24 or other fastening elements. The anchor plate 13b is ideally tensioned with the foundation body, so that a permanently embedded connection with the foundation body can be achieved.

A cavity 16 is provided on the top side of the foundation 2, in which cavity the second end 10b of the anchor rod 9 as well as the lower anchoring 14a, which is to say here the spherical collar nut 15 and the plate 25, can be accommodated. In addition, the cavity 16 can also be used to accommodate excess lengths of the tensioning elements 3 or of the anchor rods 9, which come to be as a result of the pre-tensioning in the case of large tensioning strokes (see FIG. 5b).

The pre-tensioning of the tensioning element 3 as well as the anchoring of the tensioning element 3 together with the anchor rod 9 will now be described on the basis of FIG. 5a and FIG. 5b. According to the present embodiment, the foundation 2 is initially poured with concrete, wherein at the same time, the rear suspension device 12, consisting here of two lower anchor plates 13a as well as two or even more anchor rods (without reference signs), is jointly poured in place. The cavity 16 is likewise produced during the pouring of the foundation 2.

Subsequently, an upper anchor plate 13b is placed on the foundation 2 and connected to the rear suspension device 12. Simple lock nuts 24 can, for example, be used for this purpose.

Now, a tensioning device 19 is placed on the rear suspension device 12 or connected to sleeves 23 as shown here. During pre-tensioning, the tensioning device 19 is supported on the rear suspension device 12. A tension plate 26 of the tensioning device 19 is now connected to the tendon anchor 7. Tensioning jacks 18 are furthermore positioned on the tensioning device 19. Since a tensioning device 19 with tensioning jacks 18 can be used to pre-tension the tensioning element 3, it is sufficient to provide a fixed anchor 7a as tendon anchor 7. Furthermore, if it has not already occurred, the first end 10a of the anchor rod 9 is now inserted in the accommodation 8 of the tension anchor 7.

The tensioning element 3 can then be pre-tensioned by means of the tensioning device 19 and the tensioning jacks 18. At this time, the tensioning element 3 together with anchor rod 9 can still be located at a distance from the upper anchor plate 13b. It is advantageous if, as shown here, the tensioning element 3 is initially cut to "too short" a length by the equivalent of the tensioning stroke s (see FIG. 5b). At the start of the tensioning process (FIG. 5a), the second end 10b of the anchor rod 9 is thus spaced from the lower anchor plate 13b by approximately the tensioning stroke s.

Figure 5A:
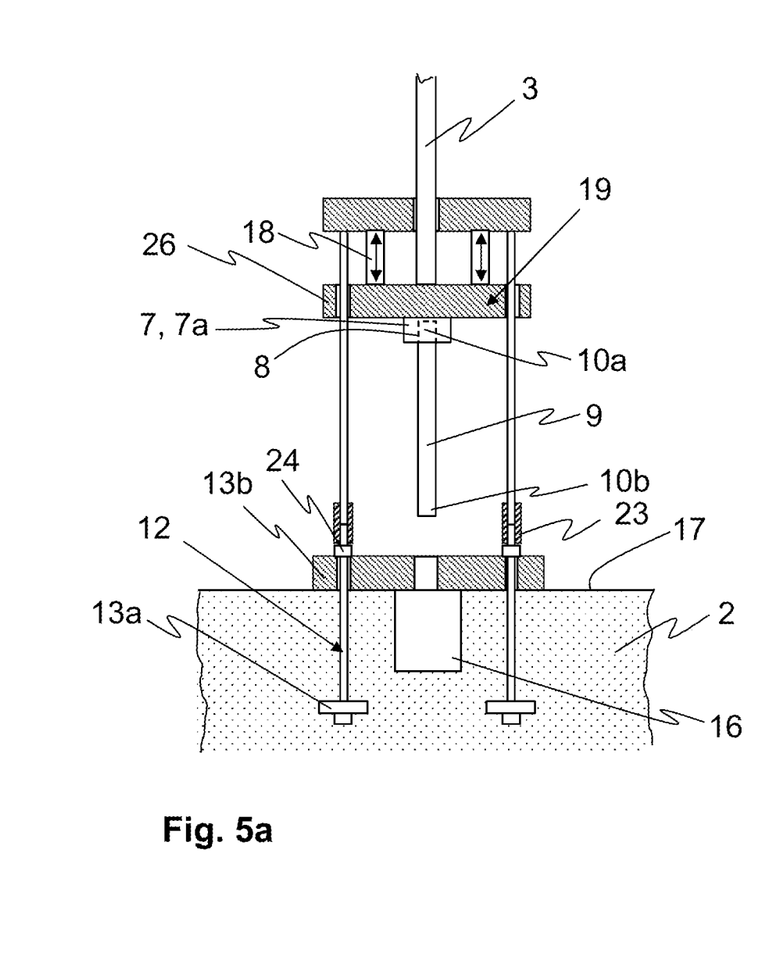
FIG. 5a shows the tensioning of a tensioning element at a lower anchoring according to a first embodiment.
Figure 5B:
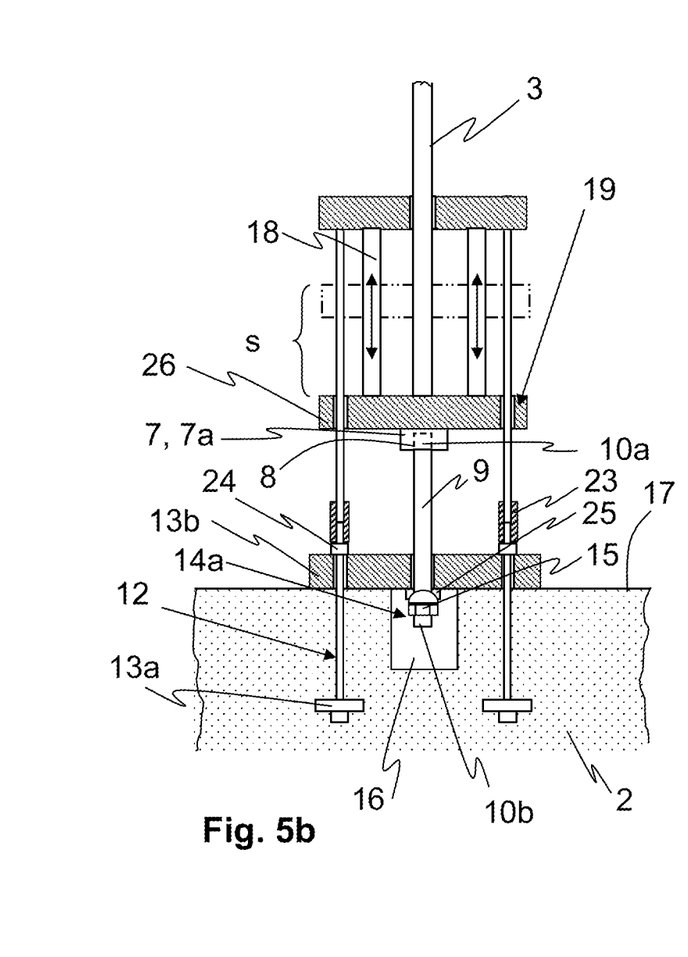

FIG. 5b shows the condition of the tensioning element 3 and of the anchor rod 9 after pre-tensioning. The tensioning element 3 has been elongated by the tensioning stroke s, so that the distance to the anchor plate 13b is now eliminated and the anchor rod 9 is guided through the opening of the anchor plate 13b. Through the cavity 16, the second end 10b of the anchor rod 9 can now be fixed by means of the spherical collar nut 15. The tensioning jacks 18 as well as the tensioning device 19 can then be removed.

As described here above, the tensioning stroke s or the elongation of the tensioning element 3 were taken into account in the fabrication of the tensioning element 3. If excess lengths nevertheless do result from the tensioning of the tensioning element 3, the excess lengths can likewise still be accommodated in the cavity 16. It is also naturally conceivable to implement the cavity 16 in a correspondingly large scale so that even excess lengths can be accommodated.

The procedure described in FIG. 5a and FIG. 5b is only to be understood as an example. It is also conceivable that the first end 10a of the anchor 9 is not yet connected to the tendon anchor 7. In this case, the second end 10b of the anchor rod 9 is first fastened or at least temporarily fixed to the rear suspension device 12 by means of the upper anchor plate 13b and a fastening means, for example, a spherical collar nut 15. Thereinafter, the tensioning device 19 as well as the tensioning jacks 18 are mounted and the tensioning element 3 is tensioned by the tensioning stroke s. Subsequently, the first end 10a of the anchor rod 9 is fastened in the accommodation 8 of the tendon anchor 7. This can comfortably be done by means of a reducing nut or reducing sleeve, which is screwed in the accommodation 8, since no torsion is introduced into the tensioning element 3 in this case. It would, however, also be possible to screw the anchor rod 9 itself into the accommodation 8. Instead of the spherical collar nut 15, another fastener could also be used, for example, a conventional lock nut 24. A conventional lock nut also leaves a certain degree of movement of the anchor rod 9 on the lower anchoring 14a.

Figure 6:
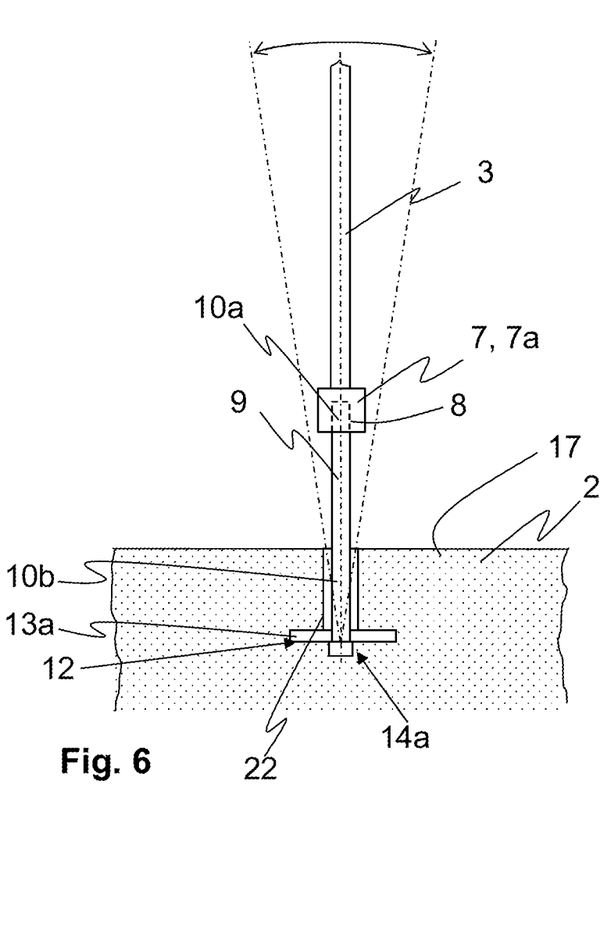
FIG. 6 shows a cross-sectional detailed view of a lower anchoring in a foundation according to a second embodiment.

FIG. 6 shows an alternative embodiment of a lower anchoring 14a. The rear suspension device 12 here comprises only one lower anchor plate 13a. The second end 10b of the anchor rod 9 is fixed directly in the lower anchor plate 13a and at least partially accommodated within the foundation 2. To allow for compensation of tolerances, the anchor rod 9 is surrounded by a soft layer 22. In this embodiment, the anchor rod 9 can already be poured in at the time of manufacturing of the foundation 2. The soft layer 22 can, for example, be provided in the form of a thick sleeve around the anchor rod 9. Alternatively, only the sleeve with the soft layer 22 and a lock nut 24 are poured in during the manufacturing of the foundation 2, and the anchor rod 9 is only first incorporated after the pouring of the concrete of the foundations 2 and fastened to the rear suspension device 12, in this case the lower anchor plate 13a. The advantage of this embodiment is that it requires far fewer parts and is easier to manufacture.

Figure 7:
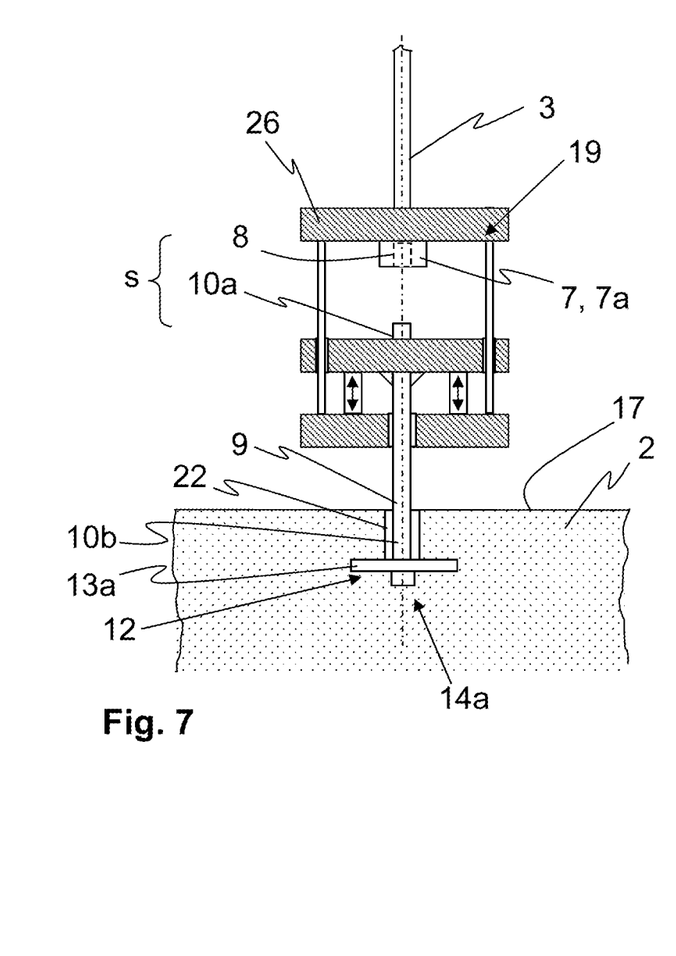
FIG. 7 shows the tensioning of a tensioning element according to the second embodiment in a schematic cross-sectional view.

FIG. 7 shows the pre-tensioning of the tensioning element 3 in an embodiment of the lower anchoring 14a according to FIG. 6. After the anchor rod 9 has been anchored with its second end 10b to the lower anchor plate 13b, a tensioning device 19 can be fixed to it or can be supported by it. A tension plate 26 of the tensioning device 19 is then connected with the tendon anchor 7 and tensioning jacks 18 are positioned on the tensioning device 19. In turn, the tension plate 26 with the tendon anchor 7 is pressed downwards by means of the tensioning jacks 18. After the tensioning element 3 is pre-tensioned by the tensioning stroke s, the tensioning element 3 can be connected with the first end 10b of the anchor rod 9. As described here above relating to FIG. 5b, this can advantageously be done with the aid of an adaptor piece 11 such as a reducing nut, since in this case no torsion is introduced into the tensioning element 3. The tensioning device 19 with the tensioning jacks 18 can then be removed. The tensioning stroke s of the tensioning element 3 is also taken into account in this embodiment.

For assembly of the tensioning elements 3, with reference to FIG. 4 and FIG. 6, a distance between the upper anchoring 14b and the lower anchoring 14a (see FIG. 1 and FIG. 8) is first determined in both versions. Starting from this distance, a required length of the tensioning element 3 is determined by subtracting the length of the anchor rod 9 to be connected to the tensioning element 3. If the upper anchoring 14b of the tensioning element 3 is likewise made by means of an anchor rod 9, the length of this anchor rod 9 is also subtracted. The tensioning stroke s is then subtracted from the required length that is determined in this way, resulting in a shortened length of the tensioning element 3. The tensioning elements 3 are prefabricated with this shortened length.

Figure 8:
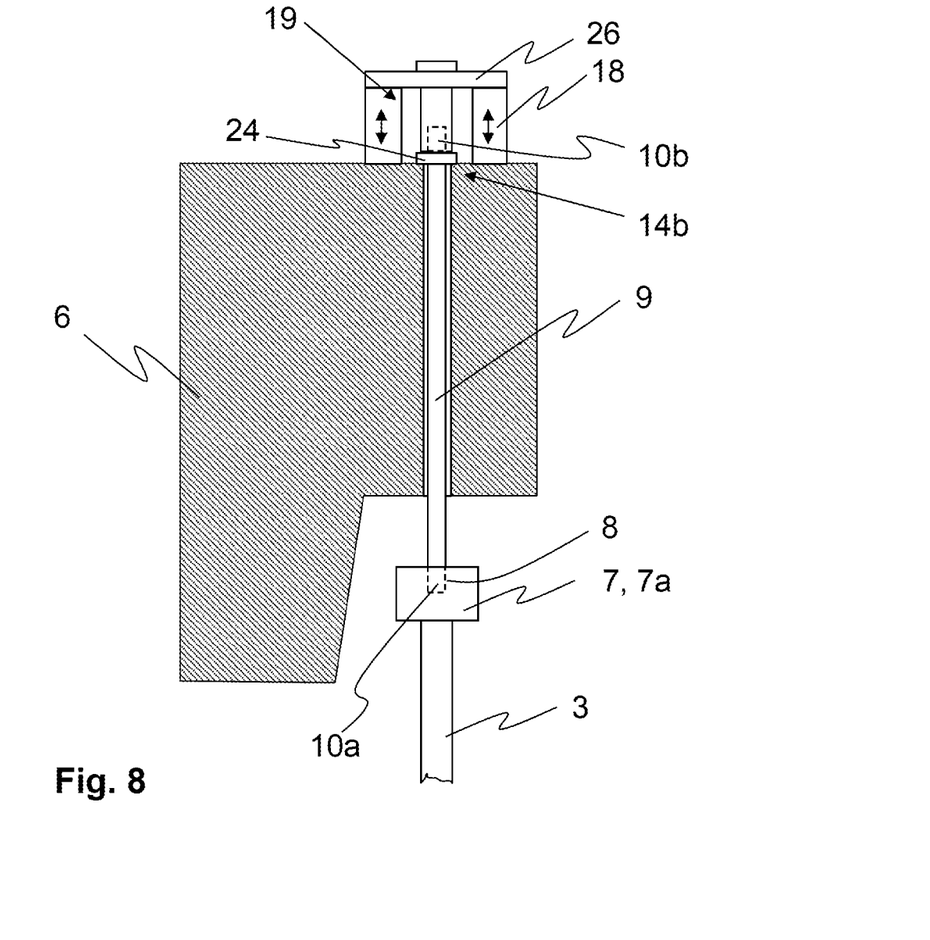
FIG. 8 shows the tensioning of a tensioning element to an upper anchoring in a schematic cross-sectional detail view.

Lastly, FIG. 8 shows a schematic, cross-sectional detailed representation of an upper anchoring 14b on a head piece 6. According to a first embodiment, that is not shown, the second end 10b of an anchor rod 9 is initially passed through the head piece 6 and fixed to the upper end of the head piece 6 by means of a lock nut 24. Subsequently, a tensioning element 3 is attached to the first end 10a of the anchor rod 9, preferably by means of an adaptor piece 11. Tensioning of the tensioning element 3 as well as fastening to the lower anchoring 14a is then carried out as described here above with reference to FIGS. 4-7.

However, in addition or alternatively to the tensioning of the tensioning element 3 at the lower anchoring 14a, it is also possible to tension the tensioning element 3 at the upper anchoring 14b. This is shown in FIG. 8. For this purpose, a tensioning device 19 is connected to the upper, second end 10b of anchor rod 9 that is passed through the head piece 6. Furthermore, two tensioning jacks 18 are positioned, which jacks are supported on the head piece 6. The pre-tensioning force of two smaller jacks can thereby be transmitted. The tensioning device 19 also includes a type of rocker as a tension plate 26, that connects the two tensioning jacks 18 with the second end 10b of the anchor rod 9. The tensioning element 3 can now be tensioned upwards and ultimately fixed. Thanks to the anchor rod 9, it is now also possible to conveniently position tensioning jacks 18 in the area of the upper anchoring 14b and to pre-tension the tensioning element 3 from above.

The present invention is not limited to the embodiment example shown and described. Variations within the scope of the claims are possible as well as any combination of the features described, even if they are shown and described in different parts of the description or alternatively in the claims or in different embodiment examples, provided that no contradiction to the independent claims arises.

REFERENCE LIST

1 Wind turbine tower
2 Foundation
3 tensioning element
4 Concrete tower section
5 Precast concrete element
6 Head piece
7 Tendon anchor
7a Fixed anchor
7b Tension anchor
8 Accommodation
9 Anchor rod
10a First end of the anchor rod
10b Second end of the anchor rod
11 Adaptor piece
12 Rear suspension device
13a Lower anchor plate
13b Upper anchor plate
14a Lower anchoring
14b Upper anchoring
15 Spherical collar nut
16 Cavity
17 Top side of the foundation
18 Tensioning jack
19 Tensioning device
20 Interior
21 Tension basement
22 Soft layer
23 Sleeve
24 Lock nut
25 Curved plate
26 Tension plate
s Tensioning stroke

What is claimed is:

1. An apparatus comprising: a structure, which is pre-tensioned with at least one tensioning element, with a foundation, with a concrete tower section, and a head piece, wherein the tensioning element has a tendon anchor, wherein the tendon anchor has an accommodation within which accommodation a first end of an anchor rod is fastened, and a second end of the anchor rod is anchored to the foundation or to the head piece, wherein the anchor rod is fastened in axial extension along a same axial line as the tensioning element in the tendon anchor.

2. The apparatus of claim 1, wherein the tendon anchor is a fixed anchor.

3. The apparatus of claim 1, wherein the first end of the anchor rod is fastened within the tendon anchor by an adaptor piece, in particular a reducing nut or a reducing sleeve.

4. The apparatus of claim 1, wherein the second end of the anchor rod is anchored to a rear suspension device embedded in the foundation and/or forms part of a rear suspension device embedded in the foundation.

5. The apparatus of claim 4, wherein the rear suspension device comprises at least one lower anchor plate embedded in the foundation.

6. The apparatus of claim 4, wherein the second end of the anchor rod is connected to the rear suspension device by at least one upper anchor plate.

7. The apparatus of claim 4, wherein the second end of the anchor rod is anchored in an articulated manner, by a spherical collar nut and/or a spherical cap, to the head piece or to the foundation, and to the rear suspension device.

8. The apparatus of claim 1, wherein the foundation has a cavity for accommodation of a lower anchoring of the second end of the anchor rod.

9. The apparatus of claim 1, wherein the structure is a wind turbine tower.

10. The apparatus of claim 1, wherein the structure comprises a plurality of precast concrete elements arranged one above the other.

11. A method for manufacturing a structure, which is pre-tensioned with at least one tensioning element, wherein the structure has a foundation, a concrete tower section, and a head piece and wherein the tensioning element is provided, at least at one of its ends, with a tendon anchor, wherein one first end of an anchor rod is fastened within an accommodation of the tendon anchor, and a second end of the anchor rod is anchored to the foundation or to the head piece, wherein the anchor rod is fastened within the tendon anchor in axial extension along a same axial line as the tensioning element.

12. The method of claim 11, wherein the second end of the anchor rod is anchored to a rear suspension device embedded in the foundation.

13. The method of claim 11, wherein the tensioning element is pre-tensioned by at least one tensioning jack.

14. The method of claim 13, wherein the first end of the anchor rod is initially connected with the tendon anchor, that the tensioning element is then pre-tensioned by the at least one tensioning jack and only after pre-tensioning is the second end of the anchor rod anchored to the foundation or to the head piece.

15. The method of claim 11, wherein the tensioning element connected to the anchor rod is tensioned against the foundation.

16. The method of claim 13, wherein the second end of the anchor rod is initially anchored to the foundation, the tensioning element is pre-tensioned by the at least one tensioning jack and only after pre-tensioning of the first end is the anchor rod connected to the tendon anchor.

17. The method of claim 11, wherein the tensioning element is tensioned against the anchor rod that is anchored with its second end to the foundation.

18. The method of claim 11, wherein a required length of the tensioning element is determined taking into account the length of the anchor rod(s), the required length is shortened by one tensioning stroke(s) and the tensioning element is prefabricated with the shortened length.

* * * * *